Figure 1:
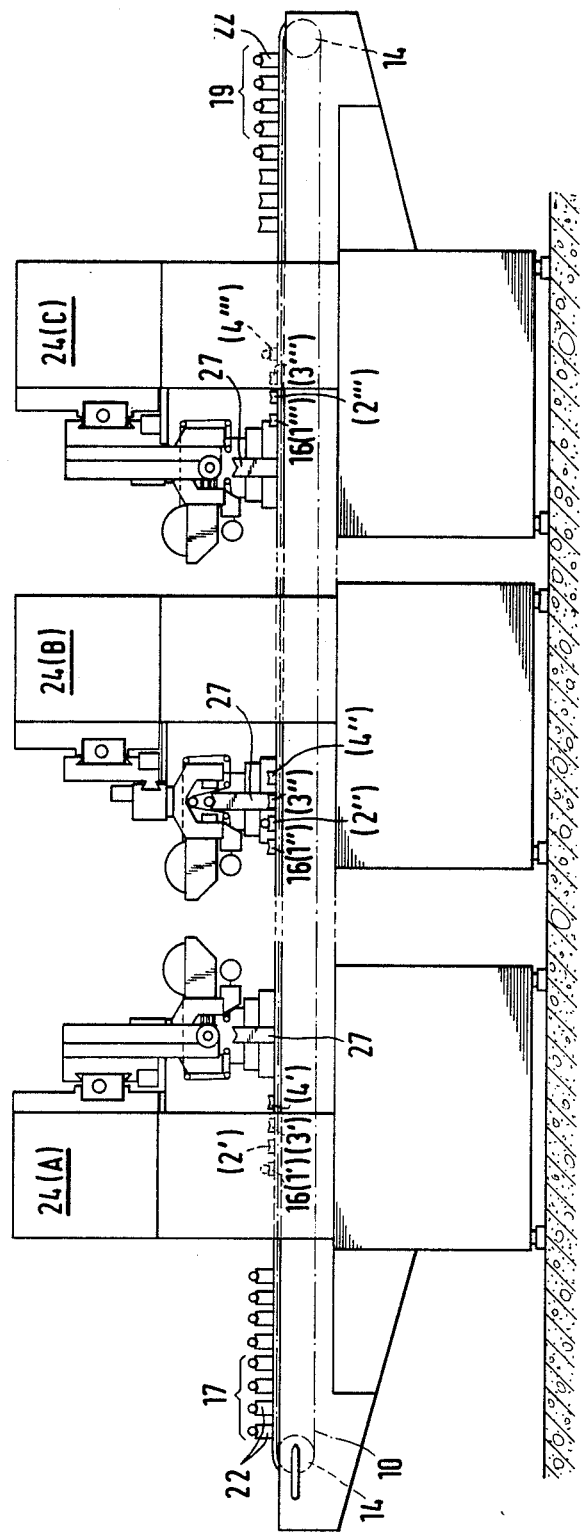

United States Patent [19]

Weber

[11] Patent Number: 4,951,419
[45] Date of Patent: Aug. 28, 1990

[54] FLEXIBLE MANUFACTURING SYSTEM

[75] Inventor: Wilfried Weber, Freudenstadt, Fed. Rep. of Germany

[73] Assignee: Maschinenbau Grieshaber GmbH & Co., Wolfach, Fed. Rep. of Germany

[21] Appl. No.: 278,036

[22] Filed: Nov. 30, 1988

[30] Foreign Application Priority Data

Nov. 30, 1987 [DE] Fed. Rep. of Germany ....... 3740597

[51] Int. Cl.$^5$ ................................................. B24B 5/04
[52] U.S. Cl. ..................................... 51/3; 51/105 SP; 51/215 E; 198/346.2
[58] Field of Search ......... 51/215 M, 215 E, 215 UE, 51/105 SP, 281 C, 289 R, 326, 327, 154, 3; 198/346.2, 817, 803.14, 468.8, 433, 429

[56] References Cited

U.S. PATENT DOCUMENTS

| | | | |
|---|---|---|---|
| 1,908,048 | 5/1933 | Player | 51/151 |
| 1,993,543 | 3/1935 | Egger | 51/73 GC |
| 2,270,522 | 1/1942 | Haeger et al. | 51/154 |
| 2,813,380 | 11/1957 | Narel et al. | 51/105 R |
| 2,813,381 | 11/1957 | Narel | 51/105 R |
| 2,895,354 | 7/1959 | Hawkinson | 198/346.2 |
| 2,961,104 | 11/1960 | Rainey et al. | 198/346.2 |
| 3,213,997 | 10/1965 | Fryer | 198/346.2 |
| 3,966,058 | 6/1976 | Heffron | 198/346.2 |
| 4,306,646 | 12/1981 | Magni | 198/346.2 |
| 4,700,824 | 10/1987 | Vere et al. | 198/468.8 |

FOREIGN PATENT DOCUMENTS

| | | | |
|---|---|---|---|
| 3044818 | 6/1982 | Fed. Rep. of Germany ... | 51/165.77 |
| 1042959 | 9/1983 | U.S.S.R. | 198/346.2 |

*Primary Examiner*—Robert A. Rose
*Attorney, Agent, or Firm*—Dennison, Meserole, Pollack & Scheiner

[57] ABSTRACT

The invention relates to a flexible manufacturing system for the automatic processing of workpieces with a random number of subsequent processing stations, whereby fast adjustment to different workpieces is ensured. The workpieces are transported to the individual processing stations by a conveyor, where they are then processed by means of freely positionable processing tools.

3 Claims, 3 Drawing Sheets

FLEXIBLE MANUFACTURING SYSTEM

The present invention relates to a flexible manufacturing system, for example for the automatic processing of workpiece surfaces. The workpieces can be, for example, camshafts or crankshafts. In their axial distance from each other, shafts of this kind have rotationally symmetrical surfaces which form bearings. In these bearings, the shaft itself is mounted or other parts of a machine are arranged around these bearings, for instance the big ends of pistons of an internal combustion engine or a pump or a compressor.

It is known to subject these rotationally symmetrical surfaces to an abrasive surface treatment by grinding or superfinishing them in order to improve the roundness and surface finish. A superfinishing stone is put on the place to be processed and adjusts to the curvature of the workpiece at this place. The stone then vibrates in axial direction. The workpiece rotates. It is also known, however, to use an abrasive belt instead of the stone-type tool or in addition to a profiled stone (US-PS 19 08 048), by which a lapping treatment of the surface is made possible. Other grinding processes may also be used.

It is, furthermore, known with shaft-like workpieces to conduct the processing of all axially parallel bearing places at the same time, also, for instance, when processing crankpins, whose circularly symmetrical surfaces are moved along the crank radius around the axis of the shaft. Then it is necessary to provide means which follow this deflection (US-PS 2 270 522 or US-PS 1 993 543).

The simultaneous processing of all bearing places of one shaft, however, does not meet the requirements, which have risen due to the increasing degree of automation, in the rapid production of such finished shafts of highest quality as single parts in a production process for prime movers and processing machines. Fully automatic or almost fully automatic processes rather require the fixed-cycle processing and provision of similar workpieces such as camshafts or crankshafts. Nonetheless, an automatic processing machine must be easily adjustable to the processing of camshafts and crankshafts by a simple change-over thereto.

With any kind of shafts to be processed, however, also mixed operation should be possible. It should be possible without the necessity of extensive changes to process and finish camshafts of random lengths and random shapes, i.e. with different distances between the cams and the beginning and the end of the camshaft as well as between the bearing surfaces between the cams, such that shafts with entirely unprocessed bearing places can be put in the machine and - after automatic processing in the machine - taken out of it ready for installation. Putting the shaft in and taking it out again should also take place automatically. To this end, input and output stations must be provided. This requirement applies to both camshafts and crankshafts or in general for the workpieces to be processed. With shafts, for instance, it must be possible to process the- different kinds of bearing places. At least one bearing place of a random kind of shaft, for example, has radial surfaces to be processed in order to take up axial forces or in order to prevent axial clearance. These radial surfaces, just like annular spherical surfaces of partly considerable, at any rate of different axial extension, must also be processed. Edge zones must also be processed, even though these edge zones have curvature radii.

For this reason, the first step for the solution of the problem consists in the provision of a machine with several stations. Of course, machines featuring several stations, which conduct different processing steps on the same workpiece, are already generally known.

In US-2,813,381, for example, a camshaft grinding machine is described which has a central chain conveyor that runs past the side of the individual processing stations. The camshafts are then lifted by a crane to the individual processing stations, whereby the camshafts can also be stored intermediately.

The DE-31 11 755 describes a crankshaft grinding device, in which a raising conveyance means is used in order to transport the crankshafts to be processed to the processing means, the raising conveyance means in turn running next to the processing stations. The crankshafts can also be turned around by the conveyance means.

The DE-82 08 343 describes a transport means for shaft-like workpieces, in which an endless conveyor with two parallel belts is used. In this case, pallets which are hung up or rest on the conveyor are used for storing the workpieces.

The DE-31 41 784 describes a means for conveying stators of electrical machines to and fro, in which also an endless chain conveyor is used which runs past the processing stations.

The US-1,047,136 describes a transporting means for thread reels of sewing machines. A parallelly movable belt is used as conveying means here.

In the US-2,813,380 another camshaft grinding machine is described, in which the chain conveyor runs along the side of the processing machines as in US-2,813,381. The camshafts are then lifted by crane from the chain conveyor to the individual processing stations.

Furthermore, two magazine articles describe general features regarding the state of the art of the grinding machines used nowadays. The articles were published in VDI-2, 1985, vol. 127, No. 23/24, pages 957–963 and in "wt-Z industrielle Fertigung" 75, 1985, No. 12, pages 737–741.

However, no machine is known in which the rotationally symmetrical bearing surfaces, which are distributed axially along the length of the shaft, of axially longitudinally extending parts such as camshafts or crankshafts for prime movers or processing machines undergo a superfinishing process in several processing stations. In this case, the stations one behind the other are arranged in parallel to the parts. The stations are connected via a transport belt which runs transversely to the stations and the parts, the details of which will be described more closely in the following. The stations which are arranged one behind the other cover the transport belt which connects them and they are each in principle constructed in the same way.

They each basically feature a random plurality of single processing means which are exchangeable each in order to make a flexible system possible.

The processing of the workpieces can be effected by the majority of the stations positioned along the endless conveyor either in a multi-stage process such that in a following station a secondary treatment of the same surface is carried out or that single processing surfaces which are spaced too closely and cannot be processed in one station due to their geometrical closeness, can be processed in different subsequent stations, or individual stations can be provided for special treatment.

A special treatment can, for example, consist in that in this station the workpiece is not only made to rotate but that it is also made to move backwards and forwards axially at the same time. In this way, the rotationally symmetrical bearing surface of a shaft-like workpiece can advantageously be ground diagonally.

The rotating direction of the workpiece can, moreover, be reversed. The exact construction of the individual processing stations is described in more detail in the parallel application ser. no. 278,037, filed Nov. 30, 1988.

As conveying systems for the workpieces to be processed, different types of conveying means can be used, such as chain conveyors, stepwise raising and conveying means (advantageous with heavier weights) and belt conveyors. The conveying mechanism is described in more detail in the following by the example of an endless chain conveyor. The chain conveyor comprises two endless conveying chains, which transport pairs of workpiece receptors spaced at predetermined lengths from each other, i.e. the receptors on the chains are parallel to give pairs, the workpiece receptors having of a bowl-shaped open top so that workpiece shafts of any random diameter can be placed therein. The two endless chains have a common drive and can be adjusted in their axial distance from each other such that they c-]! accommodate workpieces of any length without changing the distance of the two chains from their imaginary longitudinal central axis. In other words: the position of the endless conveying means comprising two chains remains constant relative to the central axis of the processing stations which are connected with the endless conveying means.

This facilitates the arrangement of the processing means with regard to the shaft-like workpieces transported to them.

At the beginning of a machine a workpiece receiving station is provided. In this receiving station, the arriving unprocessed workpieces, in this case for example camshafts or crankshafts, are put on prismatic depositing funnels which are provided in pairs on the exterior next to and above the endless conveying means and resemble the bowl-shaped receptors on the chains. These open prisms are taken together in random numbers, for example 5 to 7, on either side to form blocks. The distance of these blocks close outside the chains can be adjusted together with the distance of the chains parallel to the shaft-like workpieces. Normally, the open prisms are situated above the similar prisms on the conveying chains to allow for the free passage of the conveying chains with the open prismatic depositing receptors arranged thereon below the workpieces resting on the chains. For transferring the workpieces from the blocks to the conveying means, however, the prismatic receptors in the blocks can be lowered.

By this lowering movement, the workpieces are taken from the blocks and put on the endless conveying means. In the axis of the upper positions of the prismatic parts of the blocks, light barriers are provided, by means of which it can be determined whether a workpiece rests upon the chain or not. When all prismatic receptors of the blocks are occupied, the conveying means takes the first workpiece, transporting it to the first processing station. There it is taken over by a pair of prismatic blocks open at the top such that one of its ends is gripped by a chuck head and the other end is in axial contact with a turning center. Then the workpiece is processed in the first station and subsequently deposited on open prismatic blocks, which are stationary, yet can be adjusted in width and also lowered, from which the workpieces can in turn be transferred to the conveying means.

In this manner, the conveying means transports each workpiece to the next processing station in the row or to a later station if two subsequent stations are provided for the same processing, however at a different place of the same workpiece. Behind the last processing station, there is a discharge station which is substantially identical to the receiving station.

According to the invention, the distance between the individual processing stations and the transport speed is selected such that the transport time between two subsequent stations roughly corresponds to the processing time in the stations.

Further details, features and advantages of the invention can be gathered from the following description of a schematic drawing of an example of embodiment and its additions.

Figure 2:
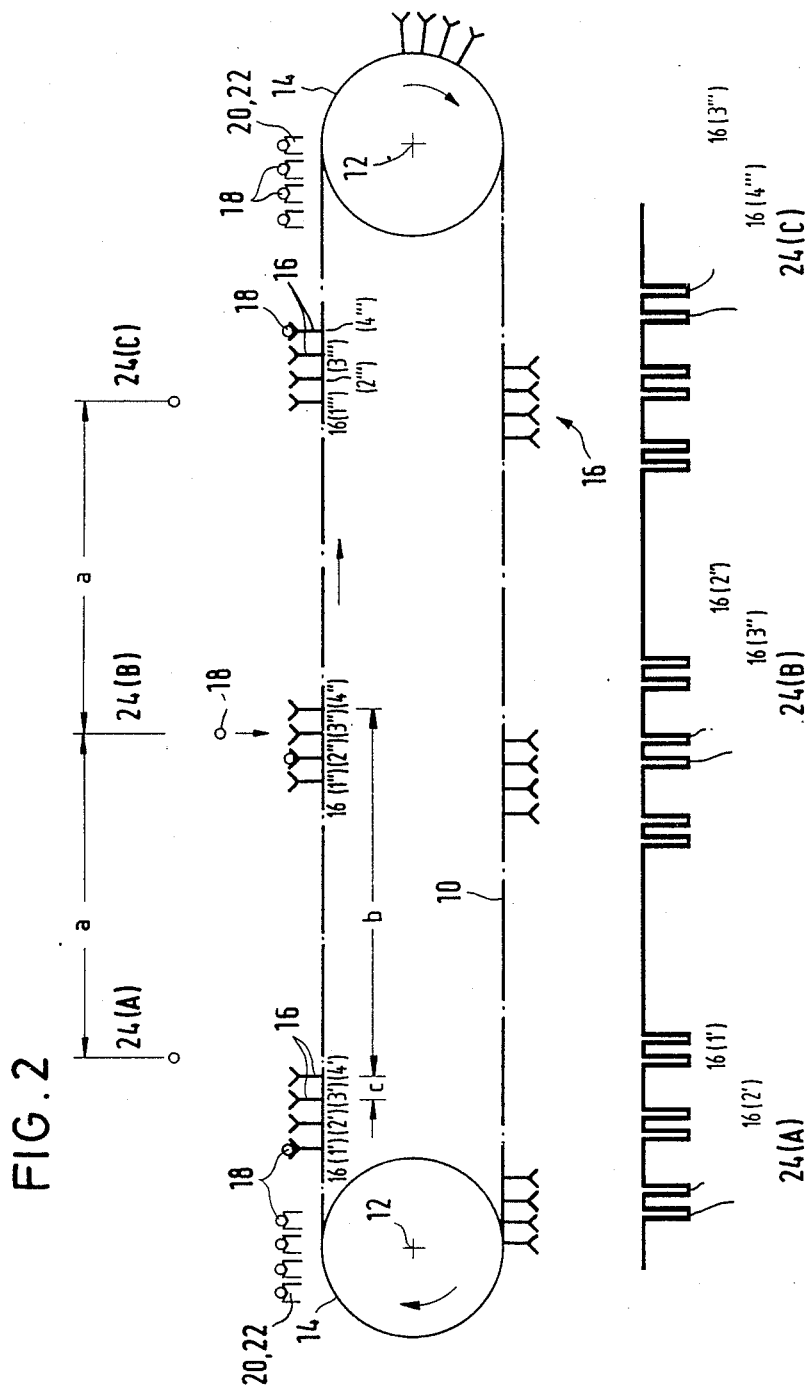
Figure 3:
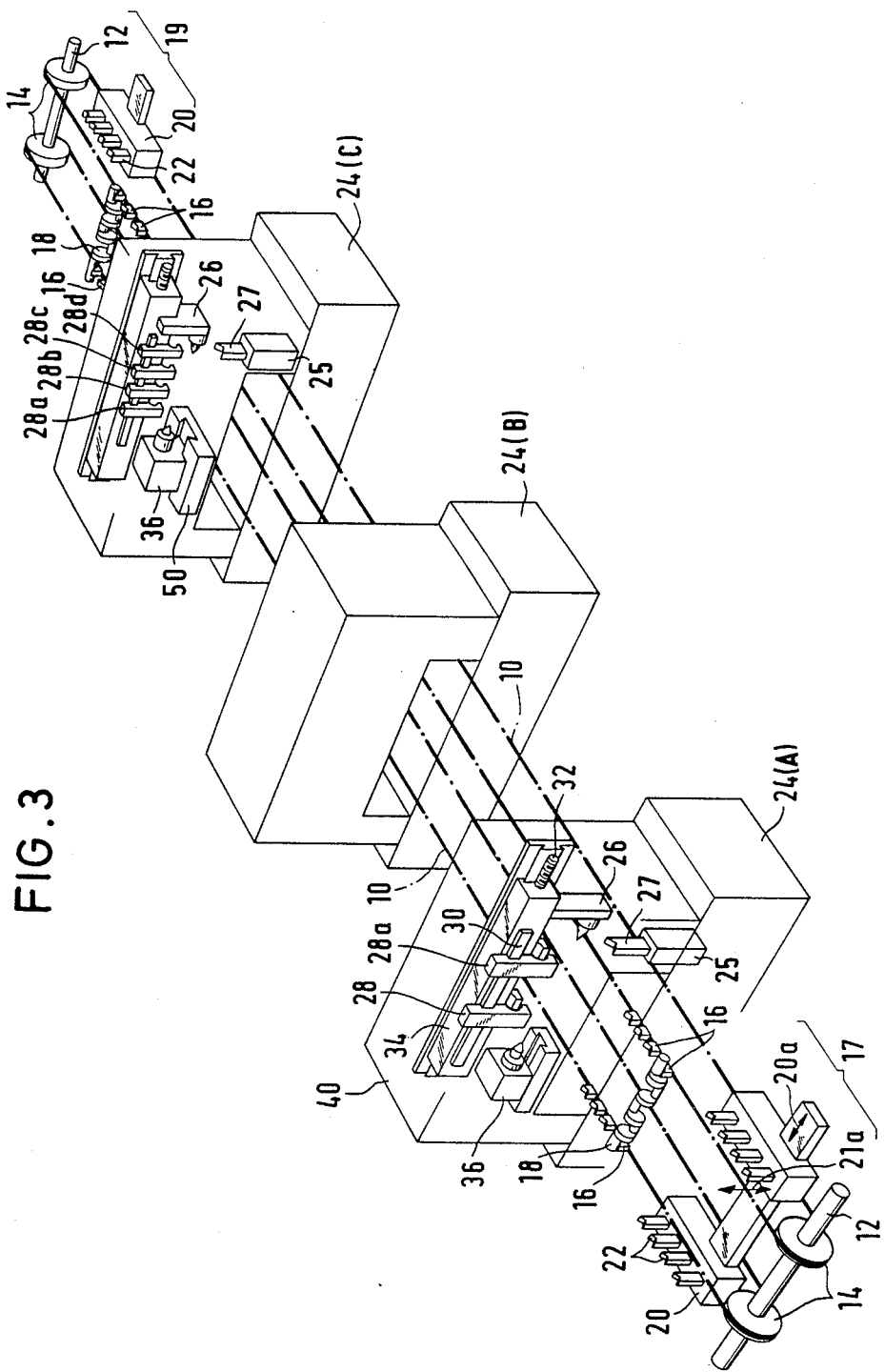

FIG. 1 is a lateral view of the essential parts of the flexible manufacturing system FIG. 2 is a schematic drawing of different positions of the conveying means FIG. 3 is a schematic total perspective of all the essential parts of the system.

FIG. 1 shows a partially schematic lateral view of a flexible manufacturing system. The system comprises a conveying means, in this case an endless chain conveyor which is formed by two identical single chains 10. Said chains 10 are driven by a common shaft 12. Two guide wheels 14 are mounted on this shaft which can be moved along the axis so that the distance between the two chains relative to a maintained central axis can be varied in order to make the transport of workpieces 18 (here crankshafts) of different widths to be processed possible. Fixed to the chains 10, there are prismatic workpiece holders 16 which are open at the top and which accommodate the workpieces 18 to be processed for further transport. The workpiece holders 16 are arranged on both chains 10 to give parallel pairs, the number of workpiece holders 16 per block being one higher than the number of processing stations of one machine.

In the present example, the chain conveyor 10 connects three subsequent processing stations 24 (A), 24 (B), 24 (C). In a lead-in magazine 17, the workpieces 18, here crankshafts, are put by machine on workpiece receptors 22 of a lift 20, which is also adjustable in width according to the double arrow 20a drawn in. In its upper position, the workpiece receptors 22 of the lift project the workpiece holders 16 of the chain conveyor. By moving the lift 20 up or down in the direction of the arrow 21a marked in, the workpieces 18 can be transferred from the receptor 22 to the conveyor 10. By lowering the lift 20, the workpiece 18 at the front is moved onto the chain conveyor 10 by the lift 20.

The workpieces 18 are put on the conveyor 10 at distances which ensure that the transport and the processing of subsequent workpieces 18 takes place at the same time, thus preventing a loss of time for transport.

Via the chain conveyor 10, the workpieces 18 are transported to the individual processing stations 24 (A), 24 (B), 24 (C). For processing and possible intermediate storage of the workpieces 18 in these working stations 24, the workpieces 18 are lifted from the chain conveyor 10 again by a single lift 25, 27. The workpiece 18 is lifted to the level of the tailstock 26 and is clamped between the latter and an axially movable chuck spindle 36. The chuck spindle 36 is connected with a drive in order to rotate the workpiece 18 around its axis. Workpieces like crankshafts or camshafts have several bearings, which can be processed by several parallel grinding tools simultaneously. In order to be able to process different crankshafts or camshafts, the individual grinding tools can be positioned at any desired distance from each other.

The tool holders 28 in the form of exchangeable cassettes can accommodate different kinds of grinding tools, such as stone holders or grinding means with an abrasive belt pressed to the shaft by means of pressing shoes. It is also possible to turn the grinding means by 90° for fine machining of vertical surfaces. The more detailed structure of the processing stations is described in the parallel application Ser. No. 287,037, filed Nov. 30, 1988.

The third processing station 24 (C) shown as an example in FIG. 3 features four tool supports 28a-d. In this station 24 (C) the workpiece 18 can also be moved backwards and forwards axially in addition to the rotating movement effected by drive 36. For this purpose, the drive 36 can be moved in its carriage 50 and the tailstock 26 can also be moved freely in the same axial direction against the action of a spring. In this manner, the bearing places can be ground diagonally, in the shape of a cross.

FIG. 2 is a schematic drawing of the path of the workpieces 18 through the stations 24 (A), 24 (B) and 24 (C) which are spaced at a distance a=2000 mm. The distance between the workpiece receiving group 16' and the workpiece receiving group 16", for example, is b=2300 mm.

The number of the single workpiece holders 16(1), 16(2), 16(3) and 16(4) in the invention is one higher than the number of processing stations 24, which equals four in the present case. The distance between the single workpiece holders 16(1), 16(2), 16(3) and 16(4) in this example is c=80 mm.

The path of the chain 10 from one stop to the next is as follows, the workpiece being always changed in each station 24 during one stop.

Each workpiece follows the following paths between and below the stations 24 (A) to 24 (C):

EXAMPLE

| | Example | | |
|---|---|---|---|
| 1st | path (c) | 80 mm | |
| 2nd | path (b − a) | 300 mm | |
| 3rd | path (c) | 80 mm | in the area of the stations |
| 4th | path (b − a) | 300 mm | |
| 5th | path (c) | 80 mm | |
| 6th | path (b − 3c − 2b + 2a) | 1460 mm | from 24 (A) to 24 (B) |
| 7th | path (c) | 80 mm | |
| 8th | path (b − a) | 300 mm | |
| 9th | path (c) | 80 mm | in the area of the station 24 (B) |
| 10th | path (b − a) | 300 mm | |
| 11th | path (c) | 80 mm | |
| 12th | path (b − 3c − 2b + 2a) | 1460 mm | from 24 (B) to 24 (C) |
| and so on | | | |

The advantage is that the workpiece lifts 25/27 remain unchanged in their position to the corresponding processing station 24. Possible changes in the length of the chain 10 in operation which are due to stretching do not have a detrimental impact on the accuracy of the operating mode of the machine.

Any clearance is compensated by the prismatic shape of the workpiece holders 16 which are open at their tops since the stretching of the chain will remain below the opening width of the prisms which are open at their top. This width is in turn selected such that any occurring diameter of workpiece shafts remains covered.

I claim:

1. Flexible manufacturing system for transporting parts comprising a random number (n) of processing stations, one station being arranged behind another station, transport belt means passing through said stations for transporting said parts to and from said stations and running transversely to said processing stations, workpiece holders arranged in groups on said transport belt for conveying said parts and comprising a number of workpiece receptors, said conveying means receiving the workpieces at the beginning of the manufacturing system, lead in magazine means for filling said workpieces at the beginning of the manufacturing system, a lead out magazine at the end of said system, means for transferring the processed workpieces to said lead out magazine, said transferring means being an endless chain conveyer, said endless chain conveyor comprising two chains driven by a common shaft, means for laterally adjusting said chains relative to a remaining central axis, multiple lifts and single lifts positioned adjacent to said system, means for laterally adjusting said chains, multiple lifts, and single lifts, said lifts being positioned transversely to said endless conveying means and located exteriorly relative to said chains, said workpiece receptors being prismatically open at their tops, said work receiving station being positioned at the beginning of said endless conveying means, transfer means located at each station for transferring said workpieces to said stations and from said stations, and a workpiece discharging station at the end of said endless conveying means which when lowered causes all of the workpiece receptors to either receive or discharge workpieces as the movement of said chain stops.

2. Flexible manufacturing system for transporting parts comprising a random number (n) of processing stations, one station being arranged behind another station, transport belt means passing through said stations for transporting said parts to and from said stations and running transversely to said processing stations, workpiece holders arranged in groups on said transport belt for conveying said parts and comprising a number of workpiece receptors, said conveying means receiving the workpieces at the beginning of the manufacturing system, lead in magazine means for filling said workpieces at the beginning of the manufacturing system, a lead out magazine at the end of said system, means for transferring the processed workpieces to said lead out magazine, said transferring means being an endless chain conveyor, said endless chain conveyor comprising two chains driven by a common shaft, means for laterally adjusting said chains relative to a remaining central axis, workpiece holders on each of said chains arranged facing each other in pairs with the number of pairs being one higher than the number of stations, multiple lifts and single lifts positioned adjacent to said system, means for laterally adjusting said chains, multiple lifts, and single lifts, said lifts being positioned transversely to said endless conveying means and located exteriorly relative to said chains, said workpiece receptors being prismatically open at their tops, said work receiving station being positioned at the beginning of said endless conveying means, transfer means located at each station for transferring said workpieces to said stations and from said stations, and a workpiece discharging station at the end of said endless conveying means which when lowered causes all of the workpiece receptors to either receive or discharge workpieces as the movement of said chain stops.

3. Flexible conveyor system comprising machines for processing workpieces and wherein said machines are arranged to be successively reached by workpieces transported thereto, conveyer means for linking said machines to each other and for transporting workpiece receptors, said workpiece receptors being arranged in groups of n receptors, whereby n equals the number of said machines plus one, the distance separating the groups of said workpiece receptors being on the order of ten to twenty percent greater than the distance separating said machines, means for stopping said conveyer means if any empty workpiece receptor lying before a filled workpiece receptor has reached the loading lift of a machine, and after lowering of the workpiece to be dealt with on the empty work piece receptor said chain moving the distance of one workpiece receptor further along to lift the unworked workpiece to the operating area of the machine, said chain then continuing to run until any workpiece receptor has reached the lift of any processing machine before a receptor holding a workpiece and at this station continuously repeats the unloading and loading of the workpiece receptors, as well as the run-on of the chain which takes place thereafter.

* * * * *